(12) United States Patent
Hsu et al.

(10) Patent No.: US 8,189,276 B1
(45) Date of Patent: May 29, 2012

(54) PHOTOGRAPHING OPTICAL LENS ASSEMBLY

(75) Inventors: Po-Lun Hsu, Taichung (TW); Ming-Ta Chou, Taichung (TW)

(73) Assignee: Largan Precision Co., Taichung (TW)

( * ) Notice: Subject to any disclaimer, the term of this patent is extended or adjusted under 35 U.S.C. 154(b) by 0 days.

(21) Appl. No.: 13/185,994

(22) Filed: Jul. 19, 2011

(30) Foreign Application Priority Data

Jan. 20, 2011 (TW) .................................. 100102192

(51) Int. Cl.
*G02B 9/12* (2006.01)
*G02B 3/02* (2006.01)
(52) U.S. Cl. ........................................ 359/784; 359/716
(58) Field of Classification Search .................. 359/716, 359/784
See application file for complete search history.

(56) References Cited

U.S. PATENT DOCUMENTS

| | | | |
|---|---|---|---|
| 7,301,808 | B2 | 11/2007 | Li et al. |
| 7,423,817 | B2 | 9/2008 | Nakanishi |
| 7,468,847 | B2 | 12/2008 | Tang |
| 7,679,841 | B2 | 3/2010 | Chen et al. |
| 2006/0171042 | A1 | 8/2006 | Hirose et al. |
| 2009/0080089 | A1 | 3/2009 | Hirose |
| 2010/0157443 | A1 | 6/2010 | Goto et al. |
| 2010/0231686 | A1 | 9/2010 | Goto et al. |

FOREIGN PATENT DOCUMENTS

| | | |
|---|---|---|
| JP | 2008139853 | 6/2008 |
| WO | 2010026689 | 1/2009 |

*Primary Examiner* — Jack Dinh
(74) *Attorney, Agent, or Firm* — Wang Law Firm, Inc.; Li K. Wang

(57) ABSTRACT

A photographing optical lens assembly, sequentially arranged from an object side to an image side, comprising: the first lens element with negative refractive power having a convex object-side surface and a concave image-side surface, the second lens element with positive refractive power having bi-convex surfaces, the third lens element with positive refractive power having a convex object-side surface, at least one aspherical surface and at least one inflection point on at least one optical surface. Additionally, the photographing optical lens assembly comprises a stop and satisfies condition such as 0.75<SL/TTL<1.1, wherein SL is the axial distance from the stop to the image plane, TTL is the axial distance from the object-side surface of first lens element to the image plane. By such arrangements, the photographing optical assembly can effectively correct the aberration and obtain superior image quality.

18 Claims, 21 Drawing Sheets

Table 1
(Embodiment 1)
f = 1.12 mm, Fno = 2.85, HFOV = 68.5 deg.

| Surface # | | Curvature Radius | Thickness | Material | Index | Abbe # | Focal length |
|---|---|---|---|---|---|---|---|
| 0 | Object | Plano | Infinity | | | | |
| 1 | Lens 1 | 1.086710 (ASP) | 0.260 | Plastic | 1.544 | 55.9 | -1.14 |
| 2 | | 0.362080 (ASP) | 0.176 | | | | |
| 3 | Ape. Stop | Plano | 0.024 | | | | |
| 4 | Lens 2 | 1.424160 (ASP) | 0.626 | Plastic | 1.544 | 55.9 | 1.38 |
| 5 | | -1.349770 (ASP) | 0.074 | | | | |
| 6 | Stop | Plano | 0.068 | | | | |
| 7 | Lens 3 | 0.723000 (ASP) | 0.592 | Plastic | 1.544 | 55.9 | 1.52 |
| 8 | | 4.014700 (ASP) | 0.190 | | | | |
| 9 | IR-filter | Plano | 0.200 | Glass | 1.516 | 64.1 | - |
| 10 | | Plano | 0.190 | | | | |
| 11 | Cover Glass | Plano | 0.400 | Glass | 1.516 | 64.1 | - |
| 12 | | Plano | 0.206 | | | | |
| 13 | Image | Plano | - | | | | |

Note: Reference wavelength is d-line 587.6nm. ASP stands for aspherical surfaces.

The effective radius of the surface #6 is 0.5mm.

FIG. 6

Table 2

(Aspheric Coefficients)

| Surface # | 1 | 2 | 4 | 5 |
|---|---|---|---|---|
| k = | 0.00000E+00 | 0.00000E+00 | -1.00000E+00 | -1.00000E+00 |
| A4 = | -1.18604E+00 | -2.16166E+00 | 4.22029E-01 | -3.16760E+00 |
| A6 = | 7.11010E-01 | 3.25927E+00 | 2.36055E+00 | 8.70123E+00 |
| A8 = | 4.65216E-01 | -2.81737E+01 | 1.37526E+01 | 1.35439E+01 |
| A10 = | | | -1.95005E+02 | -2.27619E+02 |
| A12 = | | | | 6.05500E+02 |

| Surface # | 7 | 8 |
|---|---|---|
| k = | -1.07220E+00 | -1.00000E+00 |
| A4 = | -2.68106E+00 | -4.05456E-01 |
| A6 = | 8.44786E+00 | -1.19090E+00 |
| A8 = | -2.24575E+01 | 2.74817E+00 |
| A10 = | 8.28042E+00 | -2.91917E+00 |
| A12 = | 1.15690E+02 | |
| A14 = | -2.60625E+02 | |

FIG. 7

Table 3

(Embodiment 2)
f = 0.83 mm, Fno = 2.70, HFOV = 67.4 deg.

| Surface # | | Curvature Radius | Thickness | Material | Index | Abbe # | Focal length |
|---|---|---|---|---|---|---|---|
| 0 | Object | Plano | Infinity | | | | |
| 1 | Lens 1 | 0.896432 (ASP) | 0.240 | Plastic | 1.544 | 55.9 | -0.97 |
| 2 | | 0.301083 (ASP) | 0.210 | | | | |
| 3 | Ape. Stop | Plano | 0.038 | | | | |
| 4 | Lens 2 | 2.886231 (ASP) | 0.549 | Plastic | 1.53 | 55.8 | 2.9 |
| 5 | | -3.066931 (ASP) | 0.038 | | | | |
| 6 | Stop | Plano | 0.033 | | | | |
| 7 | Lens 3 | 0.568787 (ASP) | 0.562 | Plastic | 1.544 | 55.9 | 0.88 |
| 8 | | -1.915709 (ASP) | 0.190 | | | | |
| 9 | | Plano | 0.200 | | | | |
| 10 | IR-filter | Plano | 0.190 | Glass | 1.516 | 64.1 | - |
| 11 | Cover Glass | Plano | 0.400 | Glass | 1.516 | 64.1 | - |
| 12 | | Plano | 0.198 | | | | |
| 13 | Image | Plano | - | | | | |

Note: Reference wavelength is d-line 587.6nm. ASP stands for aspherical surfaces.

The effective radius of the surface #6 is 0.5mm.

FIG. 8

Table 4
(Aspheric Coefficients)

| Surface # | 1 | 2 | 4 | 5 |
|---|---|---|---|---|
| k = | 0.00000E+00 | 0.00000E+00 | -1.00000E+00 | -1.00000E+00 |
| A4 = | 4.23195E-01 | 1.57486E+00 | 8.78993E-01 | -5.05387E+00 |
| A6 = | -3.24858E+00 | -1.27064E+01 | -3.82191E-01 | 1.03636E+01 |
| A8 = | 1.69014E+00 | -1.42967E+02 | 1.16218E+02 | 2.87507E+01 |
| A10 = | | | -1.51499E+03 | -2.65315E+02 |
| A12 = | | | | 6.05500E+02 |

| Surface # | 7 | 8 |
|---|---|---|
| k = | -1.58104E+00 | -1.00000E+00 |
| A4 = | -2.94029E+00 | 1.66895E+00 |
| A6 = | 1.17400E+01 | -6.88369E+00 |
| A8 = | -3.38753E+01 | 1.13386E+01 |
| A10 = | 2.55194E+01 | -8.78879E+00 |
| A12 = | 1.15690E+02 | |
| A14 = | -2.60625E+02 | |

FIG. 9

Table 5
(Embodiment 3)
f = 1.05 mm, Fno = 2.60, HFOV = 68.0 deg.

| Surface # | | Curvature Radius | Thickness | Material | Index | Abbe # | Focal length |
|---|---|---|---|---|---|---|---|
| 0 | Object | Plano | Infinity | | | | |
| 1 | Lens 1 | 0.615730 (ASP) | 0.260 | Plastic | 1.634 | 23.8 | -1.45 |
| 2 | | 0.308629 (ASP) | 0.240 | | | | |
| 3 | Ape. Stop | Plano | 0.041 | | | | |
| 4 | Lens 2 | 3.836831 (ASP) | 0.600 | Plastic | 1.544 | 55.9 | 1.54 |
| 5 | | -1.009297 (ASP) | 0.036 | | | | |
| 6 | Stop | Plano | 0.035 | | | | |
| 7 | Lens 3 | 0.882278 (ASP) | 0.508 | Plastic | 1.544 | 55.9 | 1.48 |
| 8 | | -7.309793 (ASP) | 0.190 | | | | |
| 9 | IR-filter | Plano | 0.200 | Glass | 1.516 | 64.1 | - |
| 10 | | Plano | 0.190 | | | | |
| 11 | Cover Glass | Plano | 0.400 | Glass | 1.516 | 64.1 | - |
| 12 | | Plano | 0.200 | | | | |
| 13 | Image | Plano | - | | | | |

Note: Reference wavelength is d-line 587.6nm. ASP stands for aspherical surfaces.

The effective radius of the surface #6 is 0.5mm.

FIG. 10

Table 6

(Aspheric Coefficients)

| Surface # | 1 | 2 | 4 | 5 |
|---|---|---|---|---|
| k = | -5.85300E-01 | -6.11524E-01 | 1.00000E+00 | -1.00000E+00 |
| A4 = | -5.23666E-01 | -2.29641E-01 | 3.92594E-01 | -2.75429E+00 |
| A6 = | -2.32266E+00 | -4.47134E+00 | -9.10344E+00 | 3.54161E+00 |
| A8 = | 1.52160E+00 | 5.10007E+01 | 1.89485E+02 | 4.72152E+01 |
| A10 = | | | -1.58421E+03 | -3.34084E+02 |
| A12 = | | | | 6.05500E+02 |

| Surface # | 7 | 8 |
|---|---|---|
| k = | -3.79362E-01 | -1.00000E+00 |
| A4 = | -2.54292E+00 | 6.42855E-02 |
| A6 = | 9.41453E+00 | -2.04778E+00 |
| A8 = | -2.57990E+01 | 4.60959E+00 |
| A10 = | 1.11572E+01 | -5.50719E+00 |
| A12 = | 1.15690E+02 | |
| A14 = | -2.60625E+02 | |

FIG. 11

Table 7
(Embodiment 4)
f = 0.84 mm, Fno = 2.65, HFOV = 70.2 deg.

| Surface # | | Curvature Radius | Thickness | Material | Index | Abbe # | Focal length |
|---|---|---|---|---|---|---|---|
| 0 | Object | Plano | Infinity | | | | |
| 1 | Lens 1 | 1.574403 (ASP) | 0.265 | Plastic | 1.633 | 23.4 | -0.86 |
| 2 | | 0.378663 (ASP) | 0.135 | | | | |
| 3 | Ape. Stop | Plano | 0.041 | | | | |
| 4 | Lens 2 | 5.076142 (ASP) | 0.550 | Plastic | 1.53 | 55.8 | 1.89 |
| 5 | | -1.199138 (ASP) | -0.108 | | | | |
| 6 | Stop | Plano | 0.181 | | | | |
| 7 | Lens 3 | 0.615149 (ASP) | 0.500 | Plastic | 1.544 | 55.9 | 0.99 |
| 8 | | -3.215434 (ASP) | 0.200 | | | | |
| 9 | IR-filter | Plano | 0.200 | Glass | 1.516 | 64.1 | - |
| 10 | | Plano | 0.200 | | | | |
| 11 | Cover Glass | Plano | 0.400 | Glass | 1.516 | 64.1 | - |
| 12 | | Plano | 0.233 | | | | |
| 13 | Image | Plano | - | | | | |

Note: Reference wavelength is d-line 587.6nm. ASP stands for aspherical surfaces.
The effective radius of the surface #6 is 0.5mm.

FIG. 12

Table 8

(Aspheric Coefficients)

| Surface # | 1 | 2 | 4 | 5 |
|---|---|---|---|---|
| k = | 0.00000E+00 | 0.00000E+00 | -1.00000E+00 | -1.00000E+00 |
| A4 = | 4.95810E-01 | 4.54967E+00 | 3.33858E-01 | -4.76446E+00 |
| A6 = | -2.26658E+00 | -5.68676E+01 | 1.48035E+01 | 1.01391E+01 |
| A8 = | 2.09300E+00 | 1.17404E+03 | -1.88985E+02 | -1.91711E+00 |
| A10 = | | | 7.55667E+02 | -1.84482E+02 |
| A12 = | | | | 6.05500E+02 |

| Surface # | 7 | 8 |
|---|---|---|
| k = | -1.17621E+00 | -1.00000E+00 |
| A4 = | -2.87304E+00 | 1.43052E+00 |
| A6 = | 1.17720E+01 | -6.46598E+00 |
| A8 = | -3.66974E+01 | 1.11812E+01 |
| A10 = | 3.23337E+01 | -9.00851E+00 |
| A12 = | 1.15690E+02 | |
| A14 = | -2.60625E+02 | |

FIG. 13

Table 9
(Embodiment 5)
f = 0.93 mm, Fno = 2.60, HFOV = 68.2 deg.

| Surface # | | Curvature Radius | Thickness | Material | Index | Abbe # | Focal length |
|---|---|---|---|---|---|---|---|
| 0 | Object | Plano | Infinity | | | | |
| 1 | Lens 1 | 1.782890 (ASP) | 0.247 | Plastic | 1.633 | 23.4 | -0.99 |
| 2 | | 0.439660 (ASP) | 0.133 | | | | |
| 3 | Ape. Stop | Plano | 0.043 | | | | |
| 4 | Lens 2 | 4.627424 (ASP) | 0.550 | Plastic | 1.53 | 55.8 | 1.58 |
| 5 | | -0.978405 (ASP) | -0.080 | | | | |
| 6 | Stop | Plano | 0.207 | | | | |
| 7 | Lens 3 | 0.573269 (ASP) | 0.500 | Plastic | 1.544 | 55.9 | 1.23 |
| 8 | | 2.832861 (ASP) | 0.200 | | | | |
| 9 | IR-filter | Plano | 0.200 | Glass | 1.516 | 64.1 | - |
| 10 | | Plano | 0.200 | | | | |
| 11 | Cover Glass | Plano | 0.400 | Glass | 1.516 | 64.1 | - |
| 12 | | Plano | 0.179 | | | | |
| 13 | Image | Plano | - | | | | |

Note: Reference wavelength is d-line 587.6nm. ASP stands for aspherical surfaces.

The effective radius of the surface #6 is 0.5mm.

FIG. 14

Table 10
(Aspheric Coefficients)

| Surface # | 1 | 2 | 4 | 5 |
|---|---|---|---|---|
| k = | 0.00000E+00 | 0.00000E+00 | -1.00000E+00 | -1.00000E+00 |
| A4 = | 3.07674E-02 | 2.56817E+00 | -3.41672E-01 | -4.55691E+00 |
| A6 = | -4.38457E-01 | -1.84499E+01 | 1.41266E+01 | 9.67347E+00 |
| A8 = | 3.56899E-01 | 5.70601E+02 | -2.57260E+02 | 1.64975E+01 |
| A10 = | | | 1.65644E+03 | -2.86330E+02 |
| A12 = | | | | 6.05500E+02 |

| Surface # | 7 | 8 |
|---|---|---|
| k = | -1.57686E+00 | -1.00000E+00 |
| A4 = | -2.96524E+00 | 5.25744E-02 |
| A6 = | 1.23984E+01 | -3.26245E+00 |
| A8 = | -3.78783E+01 | 6.94902E+00 |
| A10 = | 3.38355E+01 | -6.22195E+00 |
| A12 = | 1.15690E+02 | |
| A14 = | -2.60625E+02 | |

FIG. 15

Table 11

| | Embodiment 1 | Embodiment 2 | Embodiment 3 | Embodiment 4 | Embodiment 5 |
|---|---|---|---|---|---|
| f | 1.12 | 0.83 | 1.05 | 0.84 | 0.93 |
| Fno | 2.85 | 2.70 | 2.60 | 2.65 | 2.60 |
| HFOV | 68.5 | 67.4 | 68.0 | 70.2 | 68.2 |
| f/f1 | -0.98 | -0.86 | -0.72 | -0.97 | -0.93 |
| f/f3 | 0.74 | 0.95 | 0.71 | 0.84 | 0.76 |
| f3/f23 | 1.90 | 1.19 | 1.85 | 1.42 | 1.71 |
| CT1/T12 | 1.30 | 0.97 | 0.93 | 1.51 | 1.40 |
| CT2/T23 | 4.41 | 7.73 | 8.45 | 7.53 | 4.33 |
| R4/f2 | -0.98 | -1.06 | -0.66 | -0.63 | -0.62 |
| R1/R3 | 0.76 | 0.31 | 0.16 | 0.31 | 0.39 |
| R5/R4 | -0.54 | -0.19 | -0.87 | -0.51 | -0.59 |
| (R3+R4)/(R3-R4) | 0.03 | -0.03 | 0.58 | 0.62 | 0.65 |
| SL/TTL | 0.84 | 0.83 | 0.82 | 0.85 | 0.85 |

FIG. 16

PHOTOGRAPHING OPTICAL LENS ASSEMBLY

BACKGROUND OF THE INVENTION

1. Field of the Invention

The present invention relates to a photographing optical lens assembly, and more particularly to a photographing optical lens assembly comprised of three lens elements for a wide-angle view and applied to electronic products.

2. Description of the Related Art

As mini electronic products such as digital still cameras and mobile phone cameras generally come with an optical lens assembly for photographing an object. The optical lens assembly tends to be developed with a compact design and a low cost while achieving the effects of good aberration, high resolution and high quality of images.

In general, a conventional optical lens assembly of a mini electronic product comes with different designs including the two-lens, three-lens, four-lens, and five-lens design. Although the optical lens assembly with the four-lens or five-lens design has advantages on aberration correction and modulation transfer function (MTF), yet the cost is higher. On the other hand, the two-lens optical assembly hardly can meet the high resolution requirement, and thus the three-lens optical assembly is generally taken into consideration for the design, such as those disclosed in U.S. Pat. Nos. 7,468,847, 7,423,817, and 7,679,841, Japanese Pat. No. JP2008139853 and WIPO Pat. No. WO2010026689.

In recent years, web cams or wide-angle optical lens assembly becomes increasingly popular, and the demand for automobile or monitoring cameras becomes increasingly higher. Therefore, various types of wide-angle optical lenses with a fixed focal length are introduced. A conventional three-lens wide-angle mini optical lens assembly, a combination of different positive or negative refractive powers is adopted, as disclosed in U.S. patent Nos. US2009/080089, US2010/157443, US2010/231686 and U.S. Pat. No. 7,301,808, wherein a combination of positive refractive power, negative refractive power and positive refractive power are used for the design, but the total length of the optical lens assembly cannot be reduced effectively for the purpose of achieving a high imaging quality. U.S. patent No. US2006171042 adopts a combination of negative refractive power, positive refractive power and positive refractive power for the design, but the viewing angle is relatively too large, and it is difficult to shorten the total length of the optical lens assembly. To meet the high-quality requirement of the optical lens assembly, a better design with a good compensation of aberration is required, and the total length of the optical lens assembly can be limited for the use in the mini electronic devices. The invention provides a practical and feasible design that uses the refractive power of the three lens elements and the combination of convex and concave surfaces to increase the viewing angle and shorten the total length in addition to achieving high image quality for the application on compact electronic devices.

SUMMARY OF THE INVENTION

Therefore, it is a primary objective of the present invention to provide a photographing optical lens assembly, sequentially arranged from an object side to an image side along an optical axis, comprising: the first lens element, the second lens element and the third lens element, wherein the first lens element with negative refractive power has a convex object-side surface and a concave image-side surface; the second lens element with positive refractive power has a convex object-side surface and a convex image-side surface; the third lens element with positive refractive power has a convex object-side surface, at least one of the object-side surface and an image-side surface thereof being aspheric, and at least one of the object-side surface and the image-side surface thereof having at least one inflection point, and the following conditions are satisfied:

$$-1.8 < R_4/f_2 < -0.3 \tag{1}$$

$$0.0 < R_1/R_3 < 0.9 \tag{2}$$

$$0.75 < SL/TTL < 1.1 \tag{3}$$

$$0.45 < f/f_3 < 1.2 \tag{4}$$

Wherein, $R_1$ is a curvature radius of the object-side surface of the first lens element, $R_3$ is a curvature radius of the object-side surface of the second lens element, $R_4$ is a curvature radius of the image-side surface of the second lens element, SL is an axial distance between the stop and the image plane of the photographing optical lens assembly, TTL is an axial distance between the object-side surface of the first lens element and the image plane, f is a focal length of the photographing optical lens assembly, $f_2$ is a focal length of the second lens element, and $f_3$ is a focal length of the third lens element.

The present invention further provides a photographing optical lens assembly, substantially the same as described above, wherein the third lens element is made of plastic and one or more of the following conditions are satisfied:

$$-1.2 < f/f_1 < -0.5 \tag{5}$$

$$-0.5 < (R_3+R_4)/(R_3-R_4) < 1.0 \tag{6}$$

$$-1.0 < R_5/R_4 < -0.3 \tag{7}$$

$$3.3 < CT_2/T_{23} < 9.0 \tag{8}$$

$$0.7 < CT_1/T_{12} < 1.8 \tag{9}$$

$$\text{Preferably, } 0.8 < SL/TTL < 1.0 \tag{10}$$

$$60 < HFOV < 75 \tag{11}$$

wherein, f is the focal length of the photographing optical lens assembly, $f_1$ is a focal length of the first lens element, $R_3$ is the curvature radius of the object-side surface of the second lens element, $R_4$ is the curvature radius of the image-side surface of the second lens element, $R_5$ is a curvature radius of the object-side surface of the third lens element, $CT_1$ is a thickness of the first lens element near the optical axis, $CT_2$ is a thickness of the second lens element near the optical axis, $T_{12}$ is an axial distance between the first lens element and the second lens element, $T_{23}$ is an axial distance between the second lens element and the third lens element, SL is the axial distance between the stop and the image plane of the photographing optical lens assembly, TTL is the axial distance between the object-side surface of the first lens element and the image plane, and HFOV (in degrees) is a half of field of view.

Another objective of the present invention is to provide a photographing optical lens assembly, sequentially arranged from an object side to an image side, comprising: the first lens element with negative refractive power has a convex object-side surface and a concave image-side surface; the second lens element with positive refractive power has a convex object-side surface and a convex image-side surface; the third lens element with positive refractive power has a convex object-side surface, at least one of the object-side surface and an image-side surface thereof being aspheric, and at least one of the object-side surface and the image-side surface thereof having at least one inflection point, and the photographing optical lens assembly satisfies the following conditions:

$$0.9 < f_3/f_{23} < 3.0 \quad (12)$$

$$0.0 < R_1/R_3 < 0.9 \quad (2)$$

$$0.75 < SL/TTL < 1.1 \quad (3)$$

$$0.45 < f/f_3 < 1.2 \quad (4)$$

Wherein $R_1$ is a curvature radius of the object-side surface of the first lens element, $R_3$ is a curvature radius of the object-side surface of the second lens element, SL is an axial distance between the stop and the image plane of the photographing optical lens assembly, TTL is an axial distance between the object-side surface of the first lens element and the image plane, f is a focal length of the photographing optical lens assembly, $f_{23}$ is a composite focal length of the second lens element and the third lens element, and $f_3$ is a focal length of the third lens element.

The present invention further provides a photographing optical lens assembly, substantially the same as described above, wherein at least one of the object-side surface of the second lens element and the image-side surface of the second lens element is aspheric, and both second lens element and third lens element thereof are made of plastic, and one or more of the following conditions are satisfied:

$$3.3 < CT_2/T_{23} < 9.0 \quad (8)$$

$$0.8 < SL/TTL < 1.0 \quad (10)$$

$$60 < HFOV < 75 \quad (11)$$

wherein $CT_2$ is a thickness of the second lens element near the optical axis, $T_{23}$ is an axial distance between the second lens element and the third lens element, SL is the an axial distance between the stop and the image plane of the photographing optical lens assembly, TTL is the axial distance between the object-side surface of the first lens element and the image plane, and HFOV (in degrees) is a half of field of view.

The present invention further provides a photographing optical lens assembly, sequentially arranged from an object side to an image side, comprising: the first lens element, the second lens element and the third lens element; and may further comprise a stop, wherein the first lens element with negative refractive power has a convex object-side surface and a concave image-side surface; the second lens element with positive refractive power has a convex object-side surface and a convex image-side surface; the third lens element with positive refractive power has a convex object-side surface, at least one of the object-side surface and an image-side surface thereof being aspheric, and at least one of the object-side surface and the image-side surface thereof having at least one inflection point. The photographing optical lens assembly satisfies one or more of the following conditions, in addition to the conditions (2), (3), (4) and (12).

$$0.7 < CT_1/T_{12} < 1.8 \quad (9)$$

$$-1.1 < R_4/f_2 < -0.4$$

$$-0.5 < (R_3+R_4)/(R_3-R_4) < 1.0 \quad (6)$$

$$-1.0 < R_5/R_4 < -0.3 \quad (7)$$

wherein $CT_1$ is a thickness of the first lens element near the optical axis, $T_{12}$ is an axial distance between the first lens element and the second lens element, $R_3$ is a curvature radius of the object-side surface of the second lens element, $R_4$ is a curvature radius of the image-side surface of the second lens element, $R_5$ is a curvature radius of the object-side surface of the third lens element, and $f_2$ is a focal length of the second lens element.

With appropriate placements of lens elements among the first lens element, second lens element and third lens element along the optical axis of the present invention, good aberration correction and modulation transfer function (MTF) can be achieved effectively in a wider field of view.

In the photographing optical lens assembly of the present invention, the first lens element with negative refractive power can increase the field of view, such that after the first lens element and the second lens element with positive refractive power are assembled, the image range can be increased to improve the resolution of the photographing optical lens assembly. The third lens element with positive refractive power can effectively correct the aberration produced by the first lens element and the second lens element, such that the overall aberration and distortion of the photographing optical lens assembly can meet the high-resolution requirement.

In the photographing optical lens assembly of the present invention, the arrangement of the stop can provide a greater distance between the exit pupil of the optical lens assembly and the image plane, and images can be received by the image sensor through direct incidence, so as to avoid dark corners and achieve the telecentric effect of the image side. In general, the telecentric effect can enhance the sensing performance of image sensors such as CCD or CMOS to receive images.

If the third lens element has an inflection point, the angle for guiding out the light of an image at the edge of the third lens element is provided, such that the light of the image of the off-axis field can be guided to the image sensor, and received by the image sensor. In addition, the combination of the convex image-side surface of the second lens element and the convex object-side surface of third lens element can improve the range of the optical lens assembly and shorten the total length of the photographing optical lens assembly effectively for the application in mini electronic devices.

BRIEF DESCRIPTION OF THE DRAWINGS

FIG. 6 shows Table 1 that lists optical data of the first preferred embodiment of the present invention;

FIG. 7 shows Table 2 that lists aspherical surface data of the first preferred embodiment of the present invention;

FIG. 8 shows Table 3 that lists optical data of the second preferred embodiment of the present invention;

FIG. 9 shows Table 4 that lists aspherical surface data of the second preferred embodiment of the present invention;

FIG. 10 shows Table 5 that lists optical data of the third preferred embodiment of the present invention;

FIG. 11 shows Table 6 that lists aspherical data of the third preferred embodiment of the present invention;

FIG. 12 shows Table 7 that lists optical data of the fourth preferred embodiment of the present invention;

FIG. 13 shows Table 8 that lists aspherical surface data of the fourth preferred embodiment of the present invention;

FIG. 14 shows Table 9 that lists optical data of the fifth preferred embodiment of the present invention;

FIG. 15 shows Table 10 that lists aspherical surface data of the fifth preferred embodiment of the present invention; and FIG. 16 shows Table 11 that lists data of related relations of the first to fifth preferred embodiment of the present invention.

DETAILED DESCRIPTION OF THE PREFERRED EMBODIMENTS

Figure 1A:
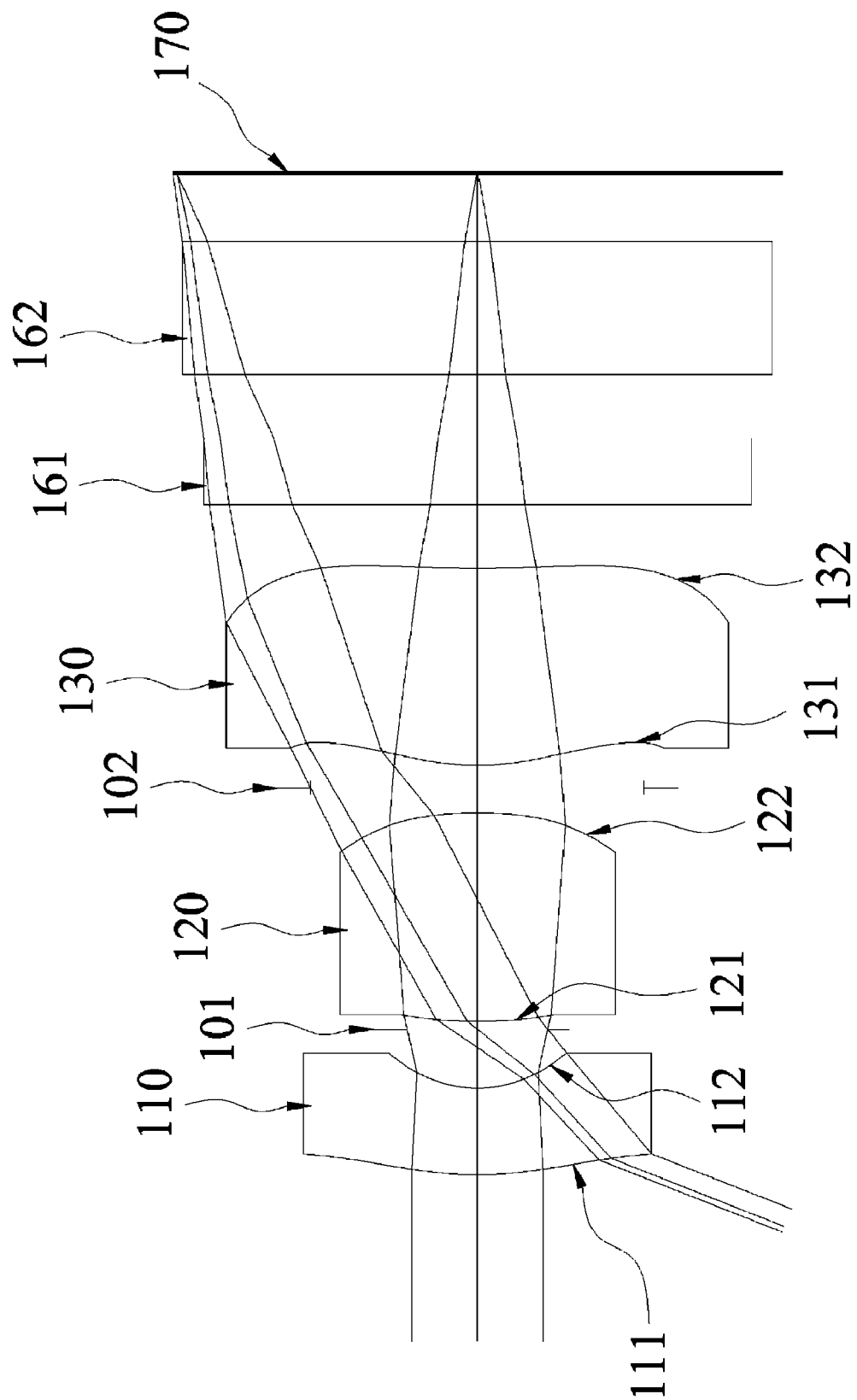
FIG. 1A is a schematic view of an optical lens assembly in accordance with the first preferred embodiment of the present invention.

With reference to FIG. 1A, the present invention provides a photographing optical lens assembly, sequentially arranged from an object side to an image side along an optical axis, comprising: the first lens element (110), an aperture stop (101), the second lens element (120), a stop (102), the third lens element (130), an infrared filter (161) and a cover glass (162), wherein the first lens element (110) with negative refractive power has a convex object-side surface (111) and a concave image-side surface (112), both first lens element object-side surface (111) and image-side surface (112) thereof being aspheric or spheric; the second lens element (120) with positive refractive power has a convex object-side surface (121) and a convex image-side surface (122), both object-side surface (121) and image-side surface (122) thereof being aspheric or spheric; the third lens element (130) with positive refractive power has a convex object-side surface (131), and at least one of the object-side surface (131) and an image-side surface (132) is aspheric, and at least one of object-side surface (131) and the image-side surface (132) thereof has at least one inflection point; the aperture stop (101) is disposed between the first lens element (110) and the second lens element (120); and the stop (102) is disposed between the second lens element (120) and the third lens element (130) to reduce stray lights and assist enhancing the image quality. The first lens element (110), the second lens element (120) and the third lens element (130) come with an aspheric surface in compliance with the aspherical surface formula as given in Equation (14).

$$X(Y) = \frac{(Y^2/R)}{1+\sqrt{(1-(1+K)(Y/R)^2)}} + \sum_i (A_i) \cdot Y^i \quad (14)$$

Wherein, X is the relative height between a point on the aspherical surface with a distance Y to the optical axis and a plane tangent to the tip of the aspherical surface along the optical axis;

Y is the distance from a point on the aspherical surface to the optical axis;

K is the conic coefficient; and

Ai is the $i^{th}$ level aspherical surface coefficient.

In the photographing optical lens assembly of the present invention, the first lens element (110), the second lens element (120) and the third lens element (130) are made of glass or plastic, and the optical surfaces thereof are spheric or aspheric. For the aspheric surface, the curvature radius of the optical surfaces can be used for changing the refractive power to eliminate or reduce aberration, so as to reduce the number of lenses used in the optical lens assembly and shorten the total length of the optical lens assembly effectively. With the installation of the first lens element (110), second lens element (120) and third lens element (130), the photographing optical lens assembly of the present invention satisfies the conditions (1), (2) and (4). If at least one optical surfaces of the third lens element (130) has at least one inflection point, and the third lens element (130) is made of plastic, the change of the surface shape formed by the inflection point of the third lens element (130) can change the refractive power of the third lens element (130) for refracting the light of an image of an object to be photographed and shortening the total length of the optical lens assembly to satisfy the condition (3) or further satisfy the condition (10). If the condition (11) is further satisfied, the optical lens assembly will have a grater field of view for the applications that require a wider angle.

In the photographing optical lens assembly of the present invention, if the ratio of the focal length $f_1$ of the first lens element (110) to the focal length f of the photographing optical lens assembly is limited (as shown in condition (5)) or the ratio of the focal length $f_2$ of the second lens element (120) to the composed focal length $f_{23}$ of the first lens element (110) and the second lens element (120) is limited (as shown in condition (12)), the refractive power of the first lens element (110) and the second lens element (120) can be assigned to facilitate the aberration correction and the reduction of the total length. If condition is limited to the condition (6), the change of shape and curvature of the object-side surface of the second lens element (121) and the image-side surface of the second lens element (122) will remain in an acceptable range to reduce the level of difficulty of the manufacture and save costs. If the condition is limited to condition (7), the ratio of curvature radius of the image-side surface of the second lens element (122) to the curvature radius of the object-side surface of the third lens element (131) will properly arrange the refractive power of the second lens element (120) and the third lens element (130). If condition (8) or (9) is satisfied, the traveling distance of light in a medium (which is the thickness $CT_1$ of the second lens element (120) along the optical axis) and the traveling distance in an air gap (which is the distance between the second lens element (120) and the third lens element (130)) are limited, or the traveling distance of light in a medium (the thickness $CT_1$ of the first lens element (110)) and the traveling distance in an air gap (which is the distance between the first lens element (110) and the second lens element (120)) are limited to facilitate the formation of images and the reduction of the total length of the optical lens assembly.

The photographing optical lens assembly of the present invention is described in details by preferred embodiments and related drawings as follows.

First Preferred Embodiment

Figure 1B:
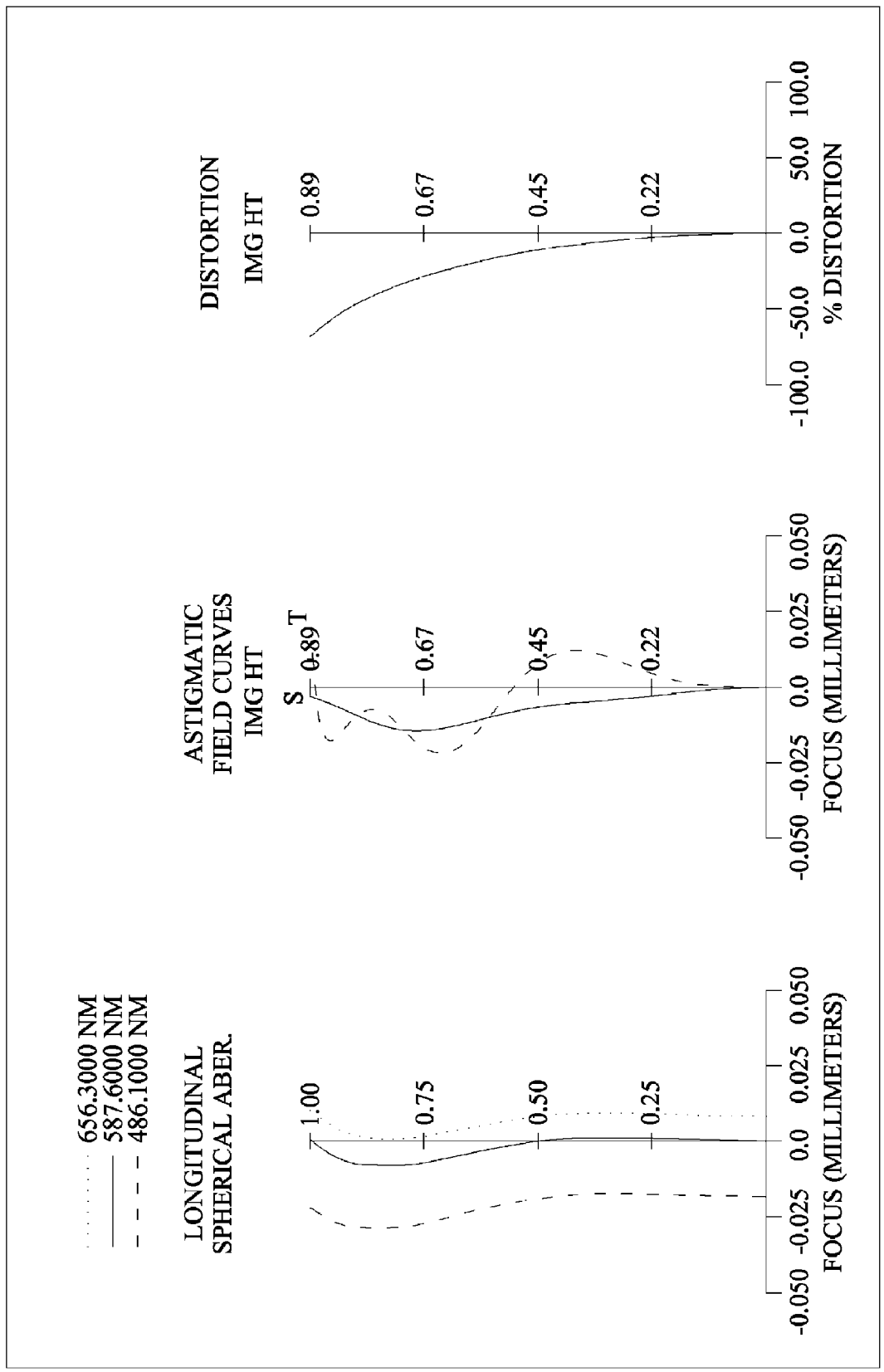
FIG. 1B is a series of aberration curves of the first preferred embodiment of the present invention.

With reference to FIGS. 1A and 1B for a schematic view of an optical system and a series of aberration curves in accordance with the first preferred embodiment of the present invention respectively, the photographing optical lens assembly is an optical lens assembly comprising three lens elements, an aperture stop (101), a field stop (102), an infrared filter (161) and a cover glass (162). More specifically, the photographing optical lens assembly, sequentially arranged from an object side to an image side along an optical axis, comprises: the first lens element (110) with negative refractive power, made of plastic, and having a convex object-side surface (111) and a concave image-side surface (112), both object-side surface (111) and image-side surface (112) thereof being aspheric; an aperture stop (101); the second lens element (120) with positive refractive power, made of plastic, and having a convex object-side surface (121) and a convex image-side surface (122), both object-side surface (121) and image-side surface (122) being aspheric; a field stop (102); the third lens element (130) with positive refractive power, made of plastic, and having a convex object-side surface (131) and a concave image-side surface (132), both object-side surface (131) and image-side surface (132) thereof being aspheric, and at least one of the object-side surface (131) and the image-side surface (132) thereof having at least one inflection point; an infrared filter (IR-filter) (161), made of glass; a cover glass (162) made of glass. The three lens elements, the aperture stop, the field stop, the infrared filter (161) and the cover glass (162) are combined with an interval apart from each other along the optical axis as shown in FIG. 6 (Table 1), such that an image of an object to be photographed can be formed at the image plane (170), and each lens is made of a material as shown in FIG. 6 (Table 1).

With reference to FIG. 6 (Table 1) for the optical data of this preferred embodiment, the object-side surface of the first lens element (111), the image-side surface of the first lens element (112), the object-side surface of the second lens element (121), the image-side surface of the second lens element (122), the object-side surface of the third lens element (131), and the image-side surface of the third lens element (132), are in compliance with the aspherical formula as shown in Equation (14) and the aspherical surface parameters are listed in FIG. 7 (Table 2).

In the photographing optical lens assembly of the first preferred embodiment, the overall focal length of the image pickup optical lens assembly is f=1.12 (mm), the aperture value is Fno=2.85 and half of the maximum view angle is HFOV=68.5 (degrees).

With reference to Table 1 for the following data of this preferred embodiment, $CT_1$ is the thickness of the first lens element (110) of the photographing optical lens assembly near the optical axis, $CT_2$ is the thickness of the second lens element (120) near the optical axis, $T_{12}$ is the axial distance between the first lens element (110) and the second lens element (120), $T_{23}$ is the axial distance between the second lens element (120) and the third lens element (130), SL is the axial distance between the aperture stop (101) and the image plane (170) of the optical lens assembly, and TTL is the axial distance between the object-side surface of the first lens element (111) and the image plane (170), and the relations of $CT_2/T_{23}$=4.41, $CT_1/T_{12}$=1.30 and SL/TTL=0.84 are derived.

In this preferred embodiment, f is the focal length of the photographing optical lens assembly of the present invention, $f_1$ is the focal length of the first lens element (110), $f_3$ is the focal length of the third lens element (130), and $f_{23}$ is the composite focal length of the second lens element (120) and the third lens element (130), and the relations of $f/f_1$=−0.98, $f/f_3$=0.74 and $f_3/f_{23}$=1.90 are derived.

In this preferred embodiment, $f_2$ is the focal length of the second lens element (120), $R_1$ is the curvature radius of the object-side surface of the first lens element (111), $R_3$ is the curvature radius of the object-side surface of the second lens element (121), $R_4$ is the curvature radius of the image-side surface of the second lens element (122), $R_5$ is the curvature radius of the object-side surface of the third lens element (131), and the relations $R_4/f_2$=−0.98, $R_1/R_3$=0.76, $(R_3+R_4)/(R_3-R_4)$=0.03, and $R_5/R_4$=−0.54 are derived; and related computing data of the relations are listed in FIG. 16 (Table 11).

From the optical data as shown in FIG. 6 (Table 1) and the aberration curve as shown in FIG. 1B, good compensation effects of the longitudinal spherical aberration, astigmatic field curving and distortion can be achieved by the photographing optical lens assembly in accordance with this preferred embodiment of the present invention.

Second Preferred Embodiment

Figure 2A:
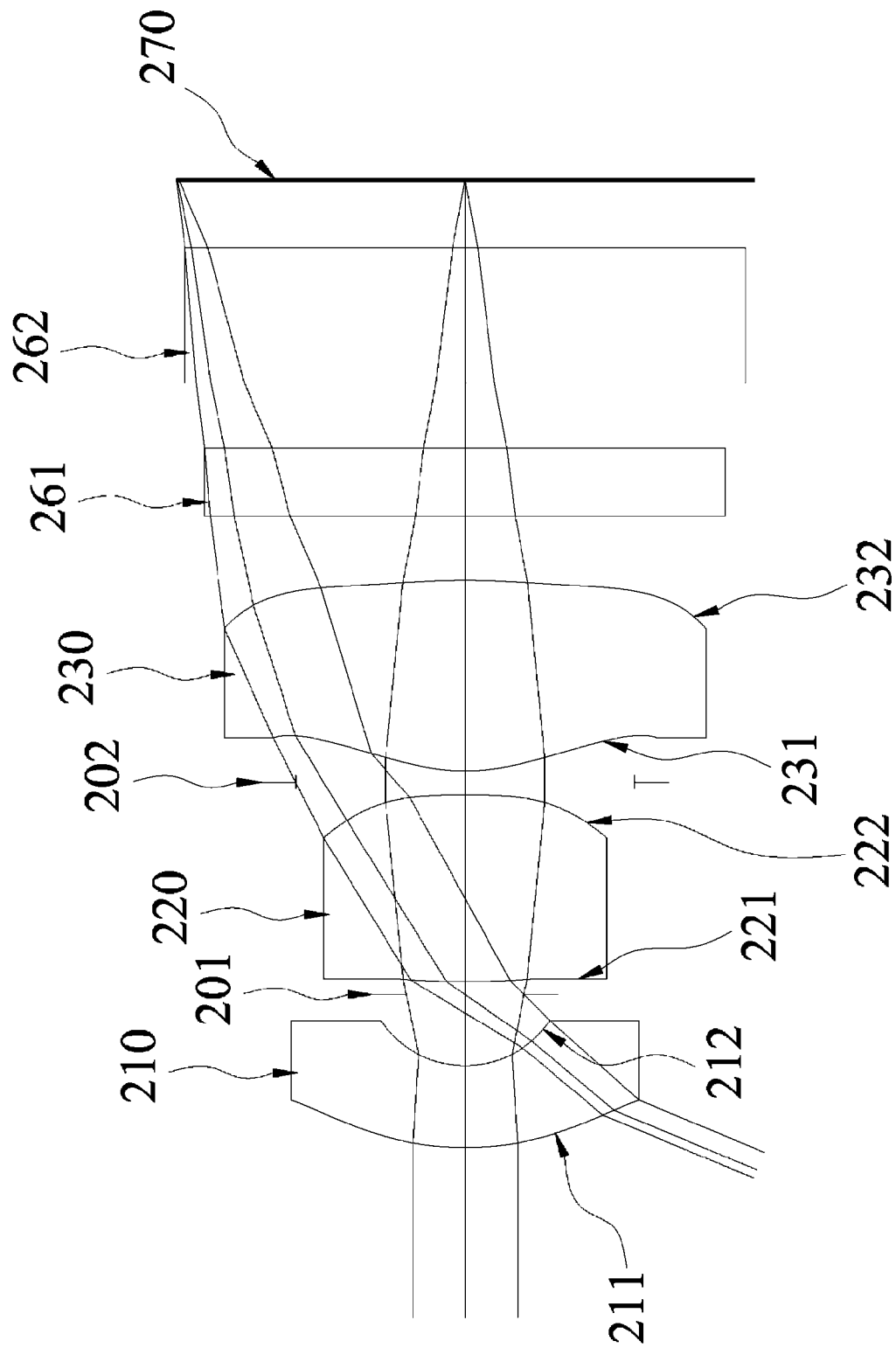
FIG. 2A is a schematic view of an optical lens assembly in accordance with the second preferred embodiment of the present invention.
Figure 2B:
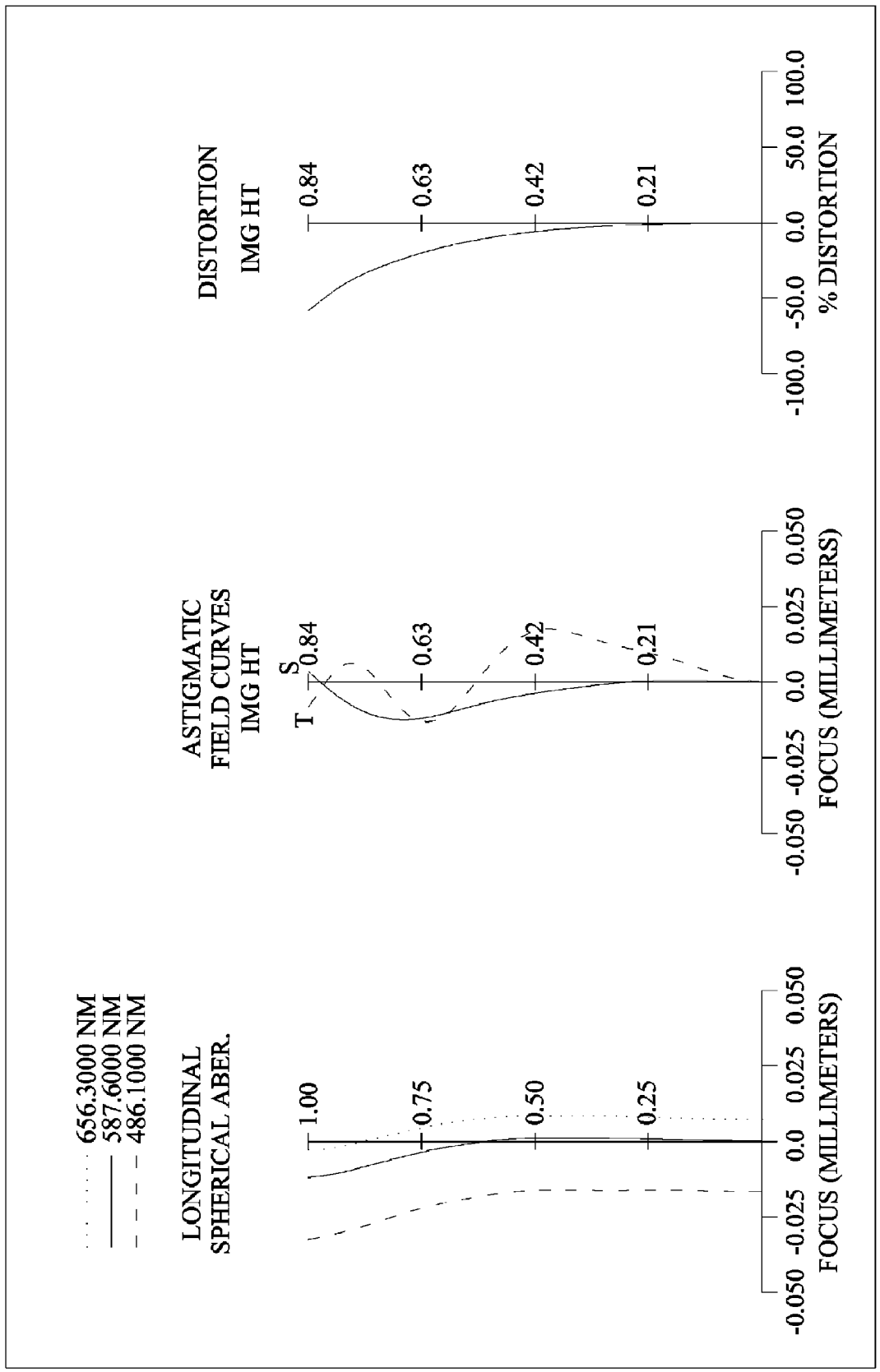
FIG. 2B is a series of aberration curves of the second preferred embodiment of the present invention.

With reference to FIGS. 2A and 2B for a schematic view of an optical system and a series of aberration curves in accordance with the second preferred embodiment of the present invention respectively, the photographing optical lens assembly is an optical lens assembly comprising three lens elements, an aperture stop (201), a field stop (202), an infrared filter (261) and a cover glass (262). More specifically, the photographing optical lens assembly, sequentially arranged from an object side to an image side along an optical axis, comprises: the first lens element (210) with negative refractive power, made of plastic, and having a convex object-side surface (211) and a convex image-side surface (212), both object-side surface (211) and image-side surface (212) thereof being aspheric; an aperture stop (201); the second lens element (220) with positive refractive power, made of plastic, and having a convex object-side surface (221) and a convex image-side surface (222), both object-side surface (221) and image-side surface (222) being aspheric; a field stop (202); the third lens element (230) with positive refractive power, made of plastic, and having a convex object-side surface (231) and a convex image-side surface (232), both object-side surface (231) and image-side surface (232) thereof being aspheric, and at least one of the object-side surface (231) and the image-side surface (232) thereof having at least one inflection point; an infrared filter (IR-filter) (261), made of glass; a cover glass (262) made of glass. The three lens elements, the aperture stop (201), the field stop (202), the infrared filter (261) and the cover glass (262) are combined with an interval apart from each other along the optical axis as shown in FIG. 8 (Table 3), such that an image of an object to be photographed can be formed at the image plane (270), and each lens is made of a material as shown in FIG. 8 (Table 3).

With reference to FIG. 8 (Table 3) for the optical data of this preferred embodiment, the object-side surface of the first lens element (211), the image-side surface of the first lens element (212), the object-side surface of the second lens element (221), the image-side surface of the second lens element (222), the object-side surface of the third lens element (231), and the image-side surface of the third lens element (232) are in compliance with the aspherical formula as shown in Equation (14) and the aspherical surface parameters are listed in FIG. 9 (Table 4).

In the photographing optical lens assembly of the second preferred embodiment, the overall focal length of the image pickup optical lens assembly is f=0.83 (mm), the f-number is Fno=2.70 and half of the maximum view angle is HFOV=67.4 (degrees).

With reference to Table 3 for the following data of this preferred embodiment, $CT_1$ is the thickness of the first lens element (210) of the photographing optical lens assembly near the optical axis, $CT_2$ is the thickness of the second lens element (220) near the optical axis, $T_{12}$ is the axial distance between the first lens element (210) and the second lens element (220), $T_{23}$ is the axial distance between the second lens element (220) and the third lens element (230), SL is the axial distance between the aperture stop (201) and the image plane (270) of the optical lens assembly, and TTL is the axial distance between the object-side surface of the first lens element (211) and the image plane (270), and the relations of $CT_2/T_{23}$=7.73, $CT_1/T_{12}$=0.97 and SL/TTL=0.83 are derived.

In this preferred embodiment, f is the focal length of the photographing optical lens assembly of the present invention, $f_1$ is the focal length of the first lens element (210), $f_3$ is the focal length of the third lens element (230), and $f_{23}$ is the composite focal length of the second lens element (220) and the third lens element (230), and the relations of $f/f_1$=−0.86, $f/f_3$=0.95 and $f_3/f_{23}$=1.19 are derived.

In this preferred embodiment, $f_2$ is the focal length of the second lens element (220), $R_1$ is the curvature radius of the object-side surface of the first lens element (211), $R_3$ is the curvature radius of the object-side surface of the second lens element (221), $R_4$ is the curvature radius of the image-side surface of the second lens element (222), $R_5$ is the curvature radius of the object-side surface of the third lens element (231), and the relations $R_4/f_2$=−1.06, $R_1/R_3$=0.31 $(R_3+R_4)/(R_3-R_4)$=−0.03, and $R_5/R_4$=−0.19 are derived; and related computing data of the relations are listed in FIG. 16 (Table 11).

From the optical data listed in FIG. 8 (which is Table 3) and the aberration curve as shown in FIG. 2B, good compensation effects of the longitudinal spherical aberration, astigmatic field curving and distortion can be achieved by the image pickup optical lens assembly in accordance with this preferred embodiment of the present invention.

Third Preferred Embodiment

Figure 3A:
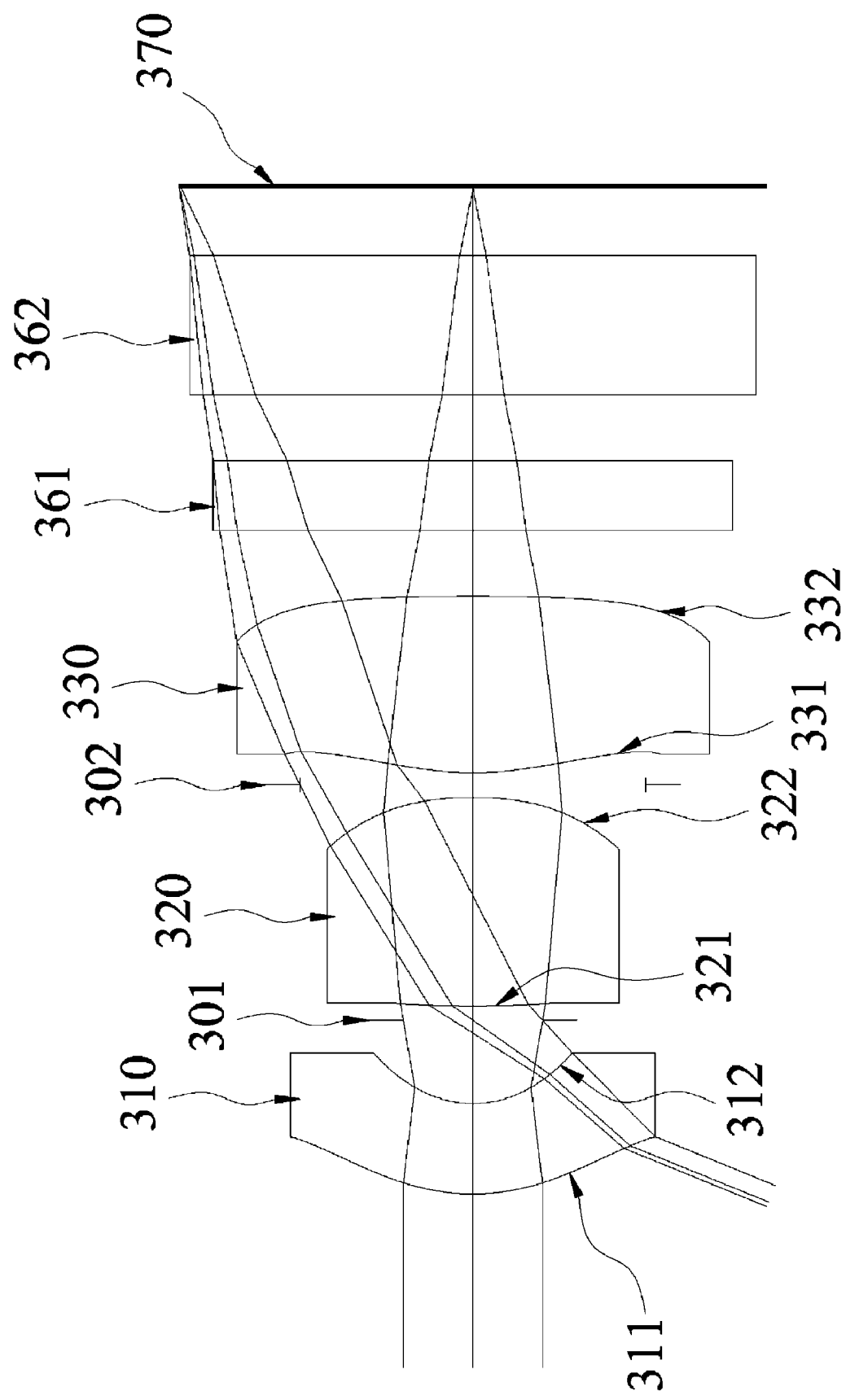
FIG. 3A is a schematic view of an optical lens assembly in accordance with the third preferred embodiment of the present invention.
Figure 3B:
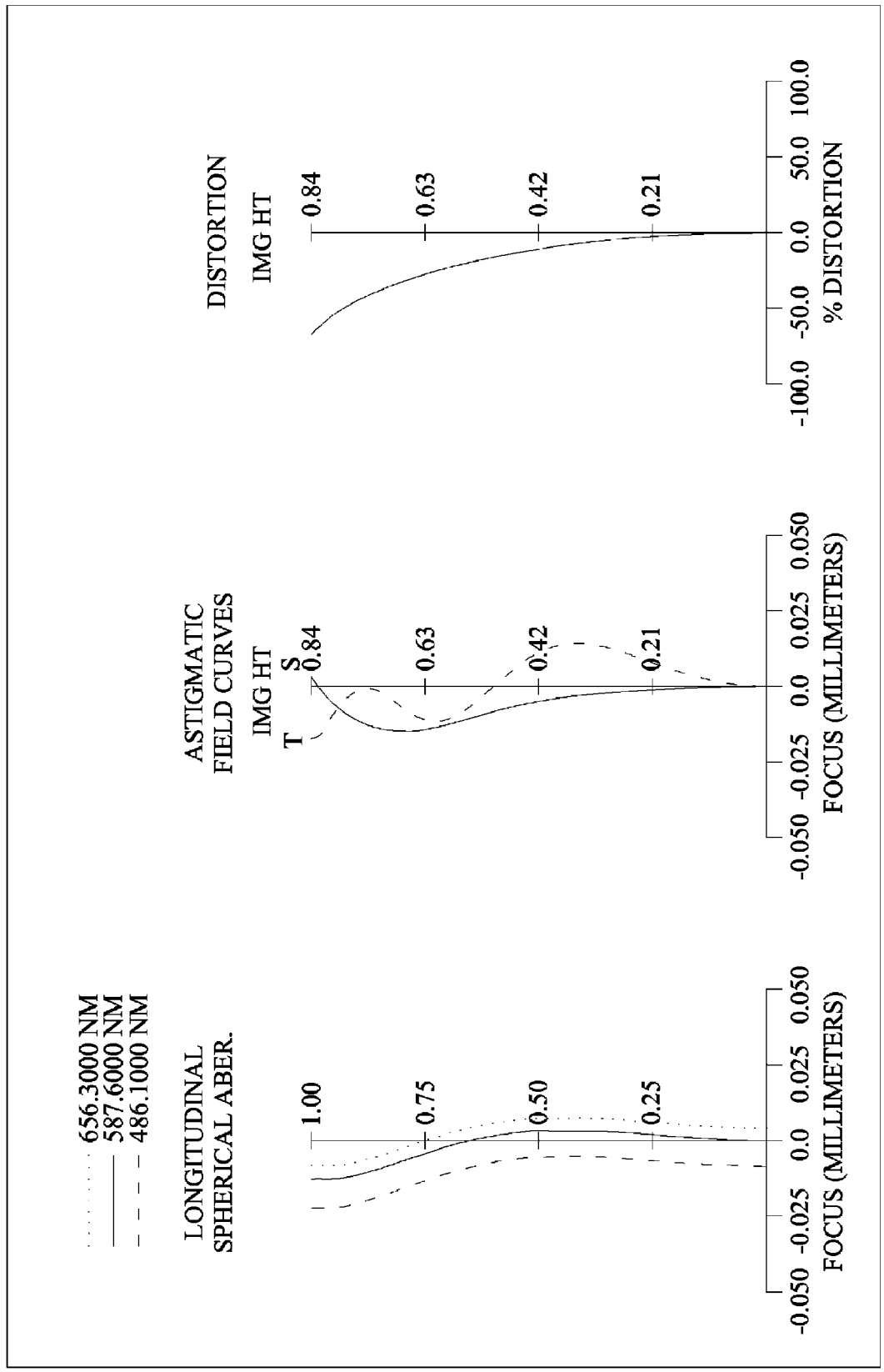
FIG. 3B is a series of aberration curves of the third preferred embodiment of the present invention.

With reference to FIGS. 3A and 3B for a schematic view of an optical system and a series of aberration curves in accordance with the third preferred embodiment of the present invention respectively, the photographing optical lens assembly is an optical lens assembly comprising three lens elements, an aperture stop (301), a field stop (302), an infrared filter (361) and a cover glass (362). More specifically, the photographing optical lens assembly, sequentially arranged from an object side to an image side along an optical axis, comprises: the first lens element (310) with negative refractive power, made of plastic, and having a convex object-side surface (311) and a concave image-side surface (312), both object-side surface (311) and image-side surface (312) thereof being aspheric; an aperture stop (301); the second lens element (320) with positive refractive power, made of plastic, and having a convex object-side surface (321) and a convex image-side surface (322), both object-side surface (321) and image-side surface (322) being aspheric; a field stop (302); the third lens element (330) with positive refractive power, made of plastic, and having a convex object-side surface (331) and a convex image-side surface (332), both object-side surface (331) and image-side surface (332) thereof being aspheric, and at least one of the object-side surface (331) and the image-side surface (332) thereof having at least one inflection point; an infrared filter (IR-filter) (361), made of glass; a cover glass (362) made of glass. The three lens elements, the aperture stop (301), the field stop (302), the infrared filter (361) and the cover glass (362) are combined with an interval apart from each other along the optical axis as shown in FIG. 10 (Table 5), such that an image of an object to be photographed can be formed at the image plane (370), and each lens is made of a material as shown in FIG. 10 (Table 5).

With reference to FIG. 10 (Table 5) for the optical data of this preferred embodiment, the object-side surface of the first lens element (311), the image-side surface of the first lens element (312), the object-side surface of the second lens element (321), the image-side surface of the second lens element (322), the object-side surface of the third lens element (331), and the image-side surface of the third lens element (332) are in compliance with the aspherical formula as shown in Equation (14) and the aspherical surface parameters are listed in FIG. 11 (Table 6).

In the photographing optical lens assembly of the third preferred embodiment, the overall focal length of the image pickup optical lens assembly is f=1.05 (mm), the f-number is Fno=2.60 and half of the maximum view angle is HFOV=68.0 (degrees).

With reference to Table 5 for the following data of this preferred embodiment, $CT_1$ is the thickness of the first lens element (310) of the photographing optical lens assembly near the optical axis, $CT_2$ is the thickness of the second lens element (320) near the optical axis, $T_{12}$ is the axial distance between the first lens element (310) and the second lens element (320), $T_{23}$ is the axial distance between the second lens element (320) and the third lens element (330), SL is the axial distance between the aperture stop (301) and the image plane (370) of the optical lens assembly, and TTL is the axial distance between the object-side surface of the first lens element (311) and the image plane (370), and the relations of $CT_2/T_{23}$=8.45, $CT_1/T_{12}$=0.93 and SL/TTL=0.82 are derived.

In this preferred embodiment, f is the focal length of the photographing optical lens assembly of the present invention, $f_1$ is the focal length of the first lens element (310), $f_3$ is the focal length of the third lens element (330), and $f_{23}$ is the composite focal length of the second lens element (320) and the third lens element (330), and the relations of $f/f_1$=−0.72, $f/f_3$=0.71 and $f_3/f_{23}$=1.85 are derived.

In this preferred embodiment, $f_2$ is the focal length of the second lens element (320), $R_1$ is the curvature radius of the object-side surface of the first lens element (311), $R_3$ is the curvature radius of the object-side surface of the second lens element (321), $R_4$ is the curvature radius of the image-side surface of the second lens element (322), $R_5$ is the curvature radius of the object-side surface of the third lens element (331), and the relations $R_4/f_2$=−0.66, $R_1/R_3$=0.16, $(R_3+R_4)/(R_3-R_4)$=0.58, and $R_5/R_4$=−0.87 are derived; and related computing data of the relations are listed in FIG. 16 (Table 11).

From the optical data listed in FIG. 10 (which is Table 5) and the aberration curve as shown in FIG. 3B, good compensation effects of the longitudinal spherical aberration, astigmatic field curving and distortion can be achieved by the image pickup optical lens assembly in accordance with this preferred embodiment of the present invention.

Fourth Preferred Embodiment

Figure 4A:
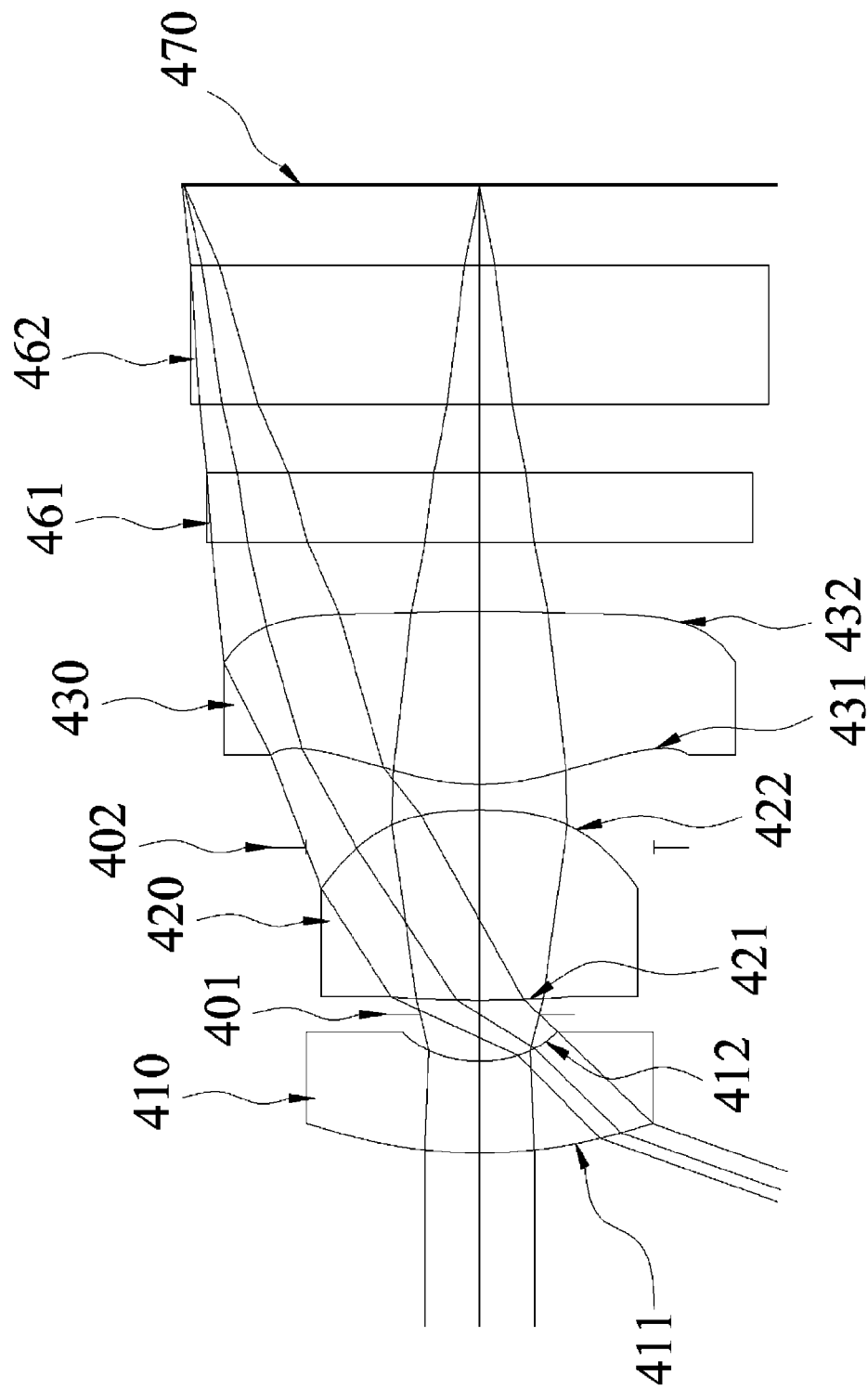
FIG. 4A is a schematic view of an optical lens assembly in accordance with the fourth preferred embodiment of the present invention.
Figure 4B:
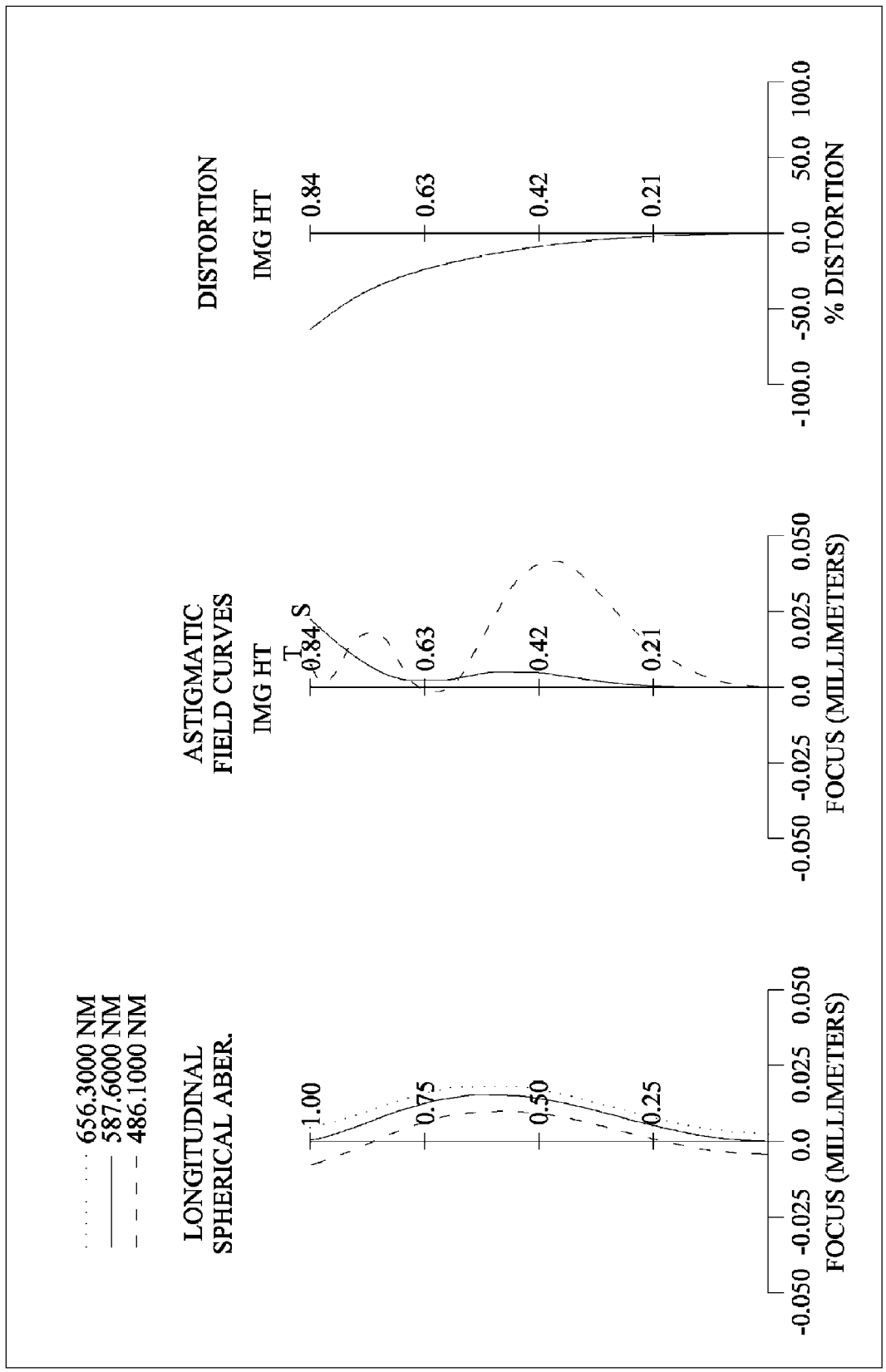
FIG. 4B is a series of aberration curves of the fourth preferred embodiment of the present invention.

With reference to FIGS. 4A and 4B for a schematic view of an optical system and a series of aberration curves in accordance with the fourth preferred embodiment of the present invention respectively, the photographing optical lens assembly is an optical lens assembly comprising three lens elements, an aperture stop (401), a field stop (402), an infrared filter (461) and a cover glass (462). More specifically, the photographing optical lens assembly, sequentially arranged from an object side to an image side along an optical axis, comprises: the first lens element (410) with negative refractive power, made of plastic, and having a convex object-side surface (411) and a concave image-side surface (412), both object-side surface (411) and image-side surface (412) thereof being aspheric; an aperture stop (401); the second lens element (420) with positive refractive power, made of plastic, and having a convex object-side surface (421) and a convex image-side surface (422), both object-side surface (421) and image-side surface (422) being aspheric; a field stop (402); the third lens element (430) with positive refractive power, made of plastic, and having a convex object-side surface (431) and a convex image-side surface (432), both object-side surface (431) and image-side surface (432) thereof being aspheric, and at least one of the object-side surface (431) and the image-side surface (432) thereof having at least one inflection point; an infrared filter (IR-filter) (461), made of glass; a cover glass (462) made of glass. The three lens elements, the aperture stop (401), the field stop (402), the infrared filter (461) and the cover glass (462) are combined with an interval apart from each other along the optical axis as shown in FIG. 12 (Table 7), such that an image of an object to be photographed can be formed at the image plane (470), and each lens is made of a material as shown in FIG. 12 (Table 7).

With reference to FIG. 12 (Table 7) for the optical data of this preferred embodiment, the object-side surface of the first lens element (411), the image-side surface of the first lens element (412), the object-side surface of the second lens element (421), the image-side surface of the second lens element (422), the object-side surface of the third lens element (431), and the image-side surface of the third lens element (432) are in compliance with the aspherical formula as shown in Equation (14) and the aspherical surface parameters are listed in FIG. 13 (Table 8).

In the photographing optical lens assembly of the fourth preferred embodiment, the overall focal length of the image pickup optical lens assembly is f=0.84 (mm), the f-number is Fno=2.65 and half of the maximum view angle is HFOV=70.2 (degrees).

With reference to Table 7 for the following data of this preferred embodiment, $CT_1$ is the thickness of the first lens element (410) of the photographing optical lens assembly near the optical axis, $CT_2$ is the thickness of the second lens element (420) near the optical axis, $T_{12}$ is the axial distance between the first lens element (410) and the second lens element (420), $T_{23}$ is the axial distance between the second lens element (420) and the third lens element (430), SL is the axial distance between the aperture stop (401) and the image plane (470) of the optical lens assembly, and TTL is the axial distance between the object-side surface of the first lens element (411) and the image plane (470), and the relations of $CT_2/T_{23}$=7.53, $CT_1/T_{12}$=1.51 and SL/TTL=0.85 are derived.

In this preferred embodiment, f is the focal length of the photographing optical lens assembly of the present invention, $f_1$ is the focal length of the first lens element (410), $f_3$ is the focal length of the third lens element (430), and $f_{23}$ is the composite focal length of the second lens element (420) and the third lens element (430), and the relations of $f/f_1$=−0.97, $f/f_3$=0.84 and $f_3/f_{23}$=1.42 are derived.

In this preferred embodiment, $f_2$ is the focal length of the second lens element (420), $R_1$ is the curvature radius of the object-side surface of the first lens element (411), $R_3$ is the curvature radius of the object-side surface of the second lens element (421), $R_4$ is the curvature radius of the image-side surface of the second lens element (422), $R_5$ is the curvature radius of the object-side surface of the third lens element (431), and the relations $R_4/f_2$=−0.63, $R_1/R_3$=0.31, $(R_3+R_4)/(R_3−R_4)$=0.62, and $R_5/R_4$=−0.51 are derived; and related computing data of the relations are listed in FIG. 16 (Table 11).

From the optical data listed in FIG. 12 (which is Table 7) and the aberration curve as shown in FIG. 4B, good compensation effects of the longitudinal spherical aberration, astigmatic field curving and distortion can be achieved by the image pickup optical lens assembly in accordance with this preferred embodiment of the present invention.

Fifth Preferred Embodiment

Figure 5A:
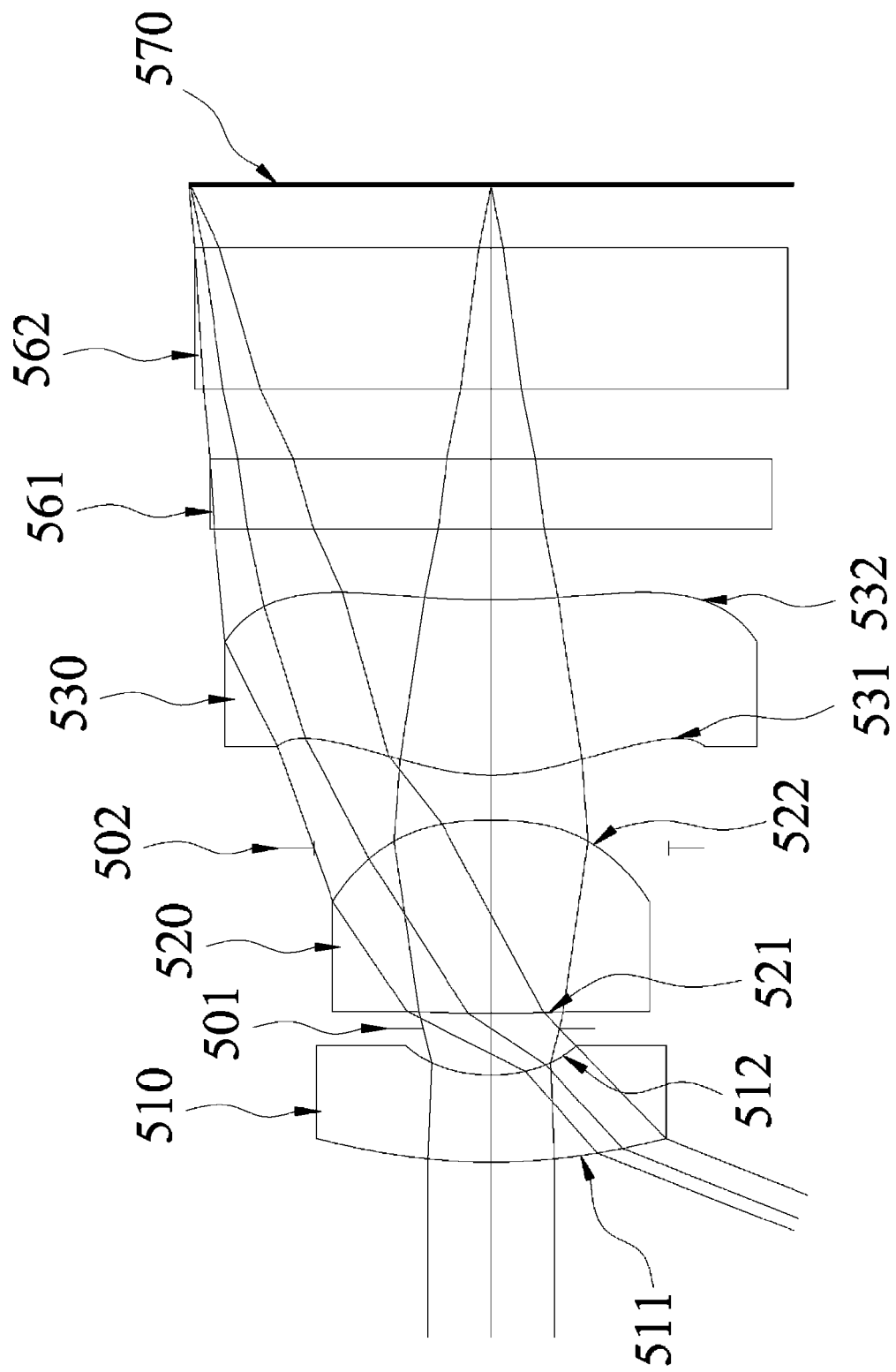
FIG. 5A is a schematic view of an optical lens assembly in accordance with the fifth preferred embodiment of the present invention.
Figure 5B:
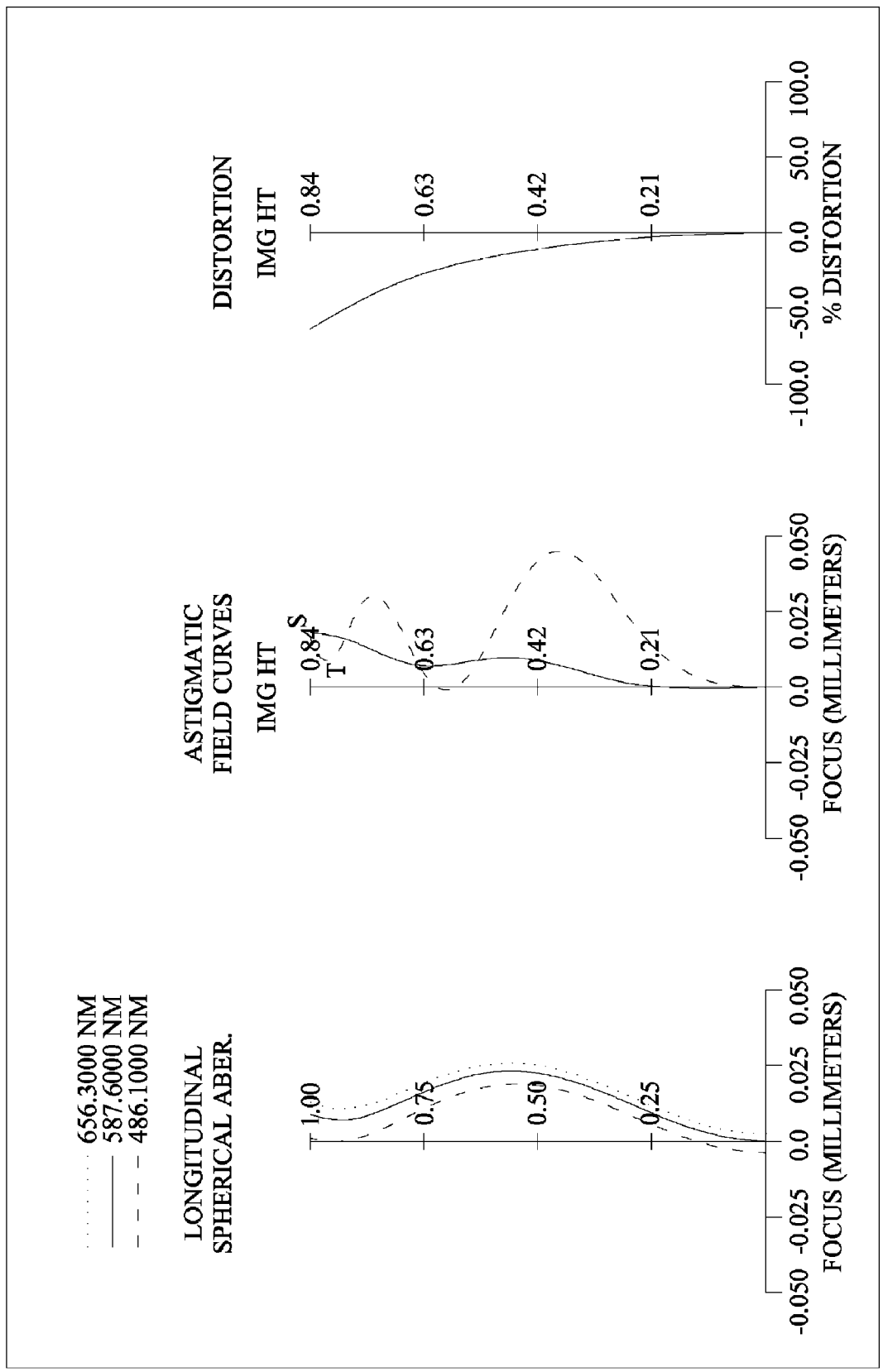
FIG. 5B is a series of aberration curves of the fifth preferred embodiment of the present invention.

With reference to FIGS. 5A and 5B for a schematic view of an optical system and a series of aberration curves in accordance with the fifth preferred embodiment of the present invention respectively, the photographing optical lens assembly is an optical lens assembly comprising three lens elements, an aperture stop (501), a field stop (502), an infrared filter (561) and a cover glass (562). More specifically, the photographing optical lens assembly, sequentially arranged from an object side to an image side along an optical axis, comprises: the first lens element (510) with negative refractive power, made of plastic, and having a convex object-side surface (511) and a concave image-side surface (512), both object-side surface (511) and image-side surface (512) thereof being aspheric; an aperture stop (501); the second lens element (520) with positive refractive power, made of plastic, and having a convex object-side surface (521) and a convex image-side surface (522), both object-side surface (521) and image-side surface (522) being aspheric; a field stop (502); the third lens element (530) with positive refractive power, made of plastic, and having a convex object-side surface (531) and a concave image-side surface (532), both object-side surface (531) and image-side surface (532) thereof being aspheric, and at least one of the object-side surface (531) and the image-side surface (532) thereof having at least one inflection point; an infrared filter (IR-filter) (561), made of glass; a cover glass (562) made of glass. The three lens elements, the aperture stop (501), the field stop (502), the infrared filter (561) and the cover glass (562) are combined with an interval apart from each other along the optical axis as shown in FIG. 14 (Table 9), such that an image of an object to be photographed can be formed at the image plane (570), and each lens is made of a material as shown in FIG. 14 (Table 9).

With reference to FIG. 14 (Table 9) for the optical data of this preferred embodiment, the object-side surface of the first lens element (511), the image-side surface of the first lens element (512), the object-side surface of the second lens element (521), the image-side surface of the second lens element (522), the object-side surface of the third lens element (531), and the image-side surface of the third lens element (532) are in compliance with the aspherical formula as shown in Equation (14) and the aspherical surface parameters are listed in FIG. 15 (Table 10).

In the photographing optical lens assembly of the fifth preferred embodiment, the overall focal length of the image pickup optical lens assembly is f=0.93 (mm), the f-number is Fno=2.60 and half of the maximum view angle is HFOV=68.2 (degrees).

With reference to Table 9 for the following data of this preferred embodiment, $CT_1$ is the thickness of the first lens element (510) of the photographing optical lens assembly near the optical axis, $CT_2$ is the thickness of the second lens element (520) near the optical axis, $T_{12}$ is the axial distance between the first lens element (510) and the second lens element (520), $T_{23}$ is the axial distance between the second lens element (520) and the third lens element (530), SL is the axial distance between the aperture stop (501) and the image plane (570) of the optical lens assembly, and TTL is the axial distance between the object-side surface of the first lens element (511) and the image plane (570), and the relations of $CT_2/T_{23}=4.33$, $CT_1/T_{12}=1.40$ and $SL/TTL=0.85$ are derived.

In this preferred embodiment, f is the focal length of the photographing optical lens assembly of the present invention, $f_1$ is the focal length of the first lens element (510), $f_3$ is the focal length of the third lens element (530), and $f_{23}$ is the composite focal length of the second lens element (520) and the third lens element (530), and the relations of $f/f_1=-0.93$, $f/f_3=0.76$ and $f_3/f_{23}=1.71$ are derived.

In this preferred embodiment, $f_2$ is the focal length of the second lens element (520), $R_1$ is the curvature radius of the object-side surface of the first lens element (511), $R_3$ is the curvature radius of the object-side surface of the second lens element (521), $R_4$ is the curvature radius of the image-side surface of the second lens element (522), $R_5$ is the curvature radius of the object-side surface of the third lens element (531), and the relations $R_4/f_2=-0.62$, $R_1/R_3=0.39$, $(R_3+R_4)/(R_3-R_4)=0.65$, and $R_5/R_4=-0.59$ are derived; and related computing data of the relations are listed in FIG. 16 (Table 11).

From the optical data listed in FIG. 14 (which is Table 9) and the aberration curve as shown in FIG. 5B, good compensation effects of the longitudinal spherical aberration, astigmatic field curving and distortion can be achieved by the image pickup optical lens assembly in accordance with this preferred embodiment of the present invention.

In the photographing optical lens assembly of the present invention, the lens can be made of glass or plastic. If the lens is made of glass, the refractive power for the photographing optical system can be selected more flexibly. If the lens is made of plastic, the production cost can be reduced effectively. In addition, an aspherical surface is formed on an optical surface of the lens, and the aspherical surface can be easily manufactured to have more control factors to eliminate or reduce aberrations, so as to reduce the number of lenses used and the total length of the image pickup optical system of the present invention.

In the photographing optical lens assembly of the present invention, if the lens surface is a convex surface, the lens surface proximate to the axis will be a convex surface; and if the lens surface is a concave surface, the lens surface proximate to the axis will be a concave surface.

In the photographing optical lens assembly of the present invention, at least one stop (not shown in the figure) such as a glare stop or a field stop is provided for reducing stray lights to facilitate improving the image quality.

Tables 1 to 10 (corresponding to FIGS. 6 to 15 respectively) show changes of values of a photographing optical system in accordance with each preferred embodiment of the present invention. However, the changes of values in the preferred embodiments of the present invention are obtained from experiments. Even if different values are used, products of the same structure are intended to be covered by the scope of the present invention. It is noteworthy to point out that the aforementioned description and the illustration of related drawings are provided for the purpose of explaining the technical characteristics of the present invention, but not intended for limiting the scope of the present invention.

While the invention has been described by means of specific embodiments, numerous modifications and variations could be made thereto by those skilled in the art without departing from the scope and spirit of the invention set forth in the claims.

What is claimed is:

1. A photographing optical lens assembly, sequentially arranged from an object side to an image side, comprising:
   a first lens element with negative refractive power, having a convex object-side surface and a concave image-side surface;
   a second lens element with positive refractive power, having a convex object-side surface and a convex image-side surface; and
   a third lens element with positive refractive power, having a convex object-side surface, at least one of the object-side surface and an image-side surface thereof being aspheric and having at least one inflection point; and the photographing optical lens assembly further comprising a stop;
   wherein $R_1$ is a curvature radius of the object-side surface of the first lens element, $R_3$ is a curvature radius of the object-side surface of the second lens element, $R_4$ is a curvature radius of the image-side surface of the second lens element, SL is an axial distance between the stop and the image plane of the photographing optical lens assembly, TTL is an axial distance between the object-side surface of the first lens element and the image plane, f is a focal length of the photographing optical lens assembly, $f_2$ is a focal length of the second lens element, $f_3$ is a focal length of the third lens element, and the following conditions are satisfied:

$$-1.8<R_4/f_2<-0.3;$$

$$0.0<R_1/R_3<0.9;$$

$$0.75<SL/TTL<1.1;$$

$$0.45<f/f_3<1.2.$$

2. The photographing optical lens assembly of claim 1, wherein the third lens element is made of plastic.

3. The photographing optical lens assembly of claim 2, wherein f is the focal length of the photographing optical lens assembly, $f_1$ is a focal length of the first lens element, and the following condition is satisfied:

$$-1.2<f/f_1<-0.5.$$

4. The photographing optical lens assembly of claim 3, wherein $R_3$ is the curvature radius of the object-side surface of the second lens element, $R_4$ is the curvature radius of the image-side surface of the second lens element, and the following condition is satisfied:

$$-0.5<(R_3+R_4)/(R_3-R_4)<1.0.$$

5. The photographing optical lens assembly of claim 3, wherein $R_4$ is the curvature radius of the image-side surface of the second lens element, $R_5$ is a curvature radius of the object-side surface of the third lens element, and the following condition is satisfied:

$$-1.0<R_5/R_4<-0.3.$$

6. The photographing optical lens assembly of claim 3, wherein $CT_2$ is a thickness of the second lens element near the optical axis, $T_{23}$ is an axial distance between the second lens element and the third lens element, and the following condition is satisfied:

$$3.3<CT_2/T_{23}<9.0.$$

7. The photographing optical lens assembly of claim 3, wherein $CT_1$ is a thickness of the first lens element near the optical axis, $T_{12}$ is an axial distance between the first lens element and the second lens element, and the following condition is satisfied:

$0.7 < CT_1/T_{12} < 1.8$.

8. The photographing optical lens assembly of claim 3, wherein SL is the axial distance between the stop and the image plane of the photographing optical lens assembly, TTL is the axial distance between the object-side surface of the first lens element and the image plane, and the following condition is satisfied:

$0.8 < SL/TTL < 1.0$

9. The photographing optical lens assembly of claim 3, wherein HFOV is a half of field of view, and the following condition is satisfied:

60<HFOV<75(in degrees).

10. A photographing optical lens assembly, sequentially arranged from an object side to an image side, comprising:
- a first lens element with negative refractive power, having a convex object-side surface and a concave image-side surface;
- a second lens element with positive refractive power, having a convex object-side surface and a convex image-side surface; and
- a third lens element with positive refractive power, having a convex object-side surface, and at least one of the object-side surface and an image-side surface thereof being aspheric and having at least one inflection point; and the photographing optical lens assembly further comprising a stop;

wherein $f_3$ is a focal length of the third lens element, $f_{23}$ is a composite focal length of the second lens element and the third lens element, $R_1$ is a curvature radius of the object-side surface of the first lens element, $R_3$ is a curvature radius of the object-side surface of the second lens element, SL is an axial distance between the stop and the image plane of the photographing optical lens assembly, TTL is an axial distance between the object-side surface of the first lens element and the image plane, f is a focal length of the photographing optical lens assembly, and the following conditions are satisfied:

$0.9 < f_3/f_{23} < 3.0$;

$0.0 < R_1/R_3 < 0.9$;

$0.75 < SL/TTL < 1.1$;

$0.45 < f/f_3 < 1.2$.

11. The photographing optical lens assembly of claim 10, wherein at least one of object-side surface and the image-side surface of the second lens element is aspheric, and both second lens element and third lens element are made of plastic.

12. The photographing optical lens assembly of claim 11, wherein $CT_2$ is a thickness of the second lens element near the optical axis, $T_{23}$ is an axial distance between the second lens element and the third lens element, and the following condition is satisfied:

$3.3 < CT_2/T_{23} < 9.0$.

13. The photographing optical lens assembly of claim 12, wherein SL is the axial distance between the stop and the image plane of the photographing optical lens assembly, TTL is the axial distance between the object-side surface of the first lens element and the image plane, and the following condition is satisfied:

$0.8 < SL/TTL < 1.0$.

14. The photographing optical lens assembly of claim 11, wherein HFOV is a half of field of view, and the following condition is satisfied:

60<HFOV<75(in degrees).

15. The photographing optical lens assembly of claim 10, wherein $CT_1$ is a thickness of the first lens element near the optical axis, $T_{12}$ is an axial distance between the first lens element and the second lens element, and the following condition is satisfied:

$0.7 < CT_1/T_{12} < 1.8$.

16. The photographing optical lens assembly of claim 15, wherein $R_4$ is a curvature radius of the image-side surface of the second lens element, $f_2$ is a focal length of the second lens element, and the following condition is satisfied:

$-1.1 < R_4/f_2 < -0.4$.

17. The photographing optical lens assembly of claim 15, wherein $R_3$ is the curvature radius of the object-side surface of the second lens element, $R_4$ is a curvature radius of the image-side surface of the second lens element, and the following condition is satisfied:

$-0.5 < (R_3+R_4)/(R_3-R_4) < 1.0$.

18. The photographing optical lens assembly of claim 15, wherein $R_4$ is a curvature radius of the image-side surface of the second lens element, $R_5$ is a curvature radius of the object-side surface of the third lens element, and the following condition is satisfied:

$-1.0 < R_5/R_4 < -0.3$.

* * * * *